United States Patent
Thesz et al.

(10) Patent No.: US 8,673,029 B2
(45) Date of Patent: Mar. 18, 2014

(54) USE OF FUELS OR FUEL ADDITIVES BASED ON TRIGLYCERIDES OF MODIFIED STRUCTURE AND PROCESS FOR THEIR PREPARATION

(75) Inventors: Janos Thesz, Budapest (HU); Bela Istvan Boros, Budapest (HU); Zoltan Kiraly, Budapest (HU)

(73) Assignees: Janos Thesz, Budapest (HU); Bela Istvan Boros, Budapest (HU); Zoltan Kiraly, Budapest (HU); Sandor Lorincz, Szekesfehervar (HU)

( * ) Notice: Subject to any disclaimer, the term of this patent is extended or adjusted under 35 U.S.C. 154(b) by 936 days.

(21) Appl. No.: 12/525,812

(22) PCT Filed: Feb. 5, 2008

(86) PCT No.: PCT/HU2008/000013
§ 371 (c)(1),
(2), (4) Date: Jan. 29, 2010

(87) PCT Pub. No.: WO2008/096187
PCT Pub. Date: Aug. 14, 2008

(65) Prior Publication Data
US 2010/0223842 A1 Sep. 9, 2010

(30) Foreign Application Priority Data

Feb. 6, 2007  (HU) .................................. 0700128
Mar. 1, 2007  (HU) .................................. 0700187
Apr. 16, 2007 (HU) .................................. 0700281

(51) Int. Cl.
*C10L 1/19* (2006.01)

(52) U.S. Cl.
USPC .............................................. 44/398; 44/308

(58) Field of Classification Search
USPC .............. 554/174, 168; 435/134; 44/398, 308
See application file for complete search history.

(56) References Cited

U.S. PATENT DOCUMENTS

| 8,324,413 B2 | 12/2012 | O'Rear | |
|---|---|---|---|
| 8,361,172 B2 | 1/2013 | O'Rear | |
| 2006/0252950 A1* | 11/2006 | Ginosar et al. | 554/174 |
| 2009/0203092 A1* | 8/2009 | Eisner et al. | 435/134 |

FOREIGN PATENT DOCUMENTS

| EP | 1580255 | * | 9/2005 |
| EP | 1580255 A1 | * | 9/2005 |

* cited by examiner

*Primary Examiner* — Walter D Griffin
*Assistant Examiner* — Chantel Graham
(74) *Attorney, Agent, or Firm* — Birch, Stewart, Kolasch & Birch, LLP

(57) ABSTRACT

The invention is directed to the use of triglycerides of modified structure, mostly known per se, as fuels, combustibles, or fuel and/or combustible additives, and to the fuels comprising them. In the description and in the claims the expression "fuel" means liquid motor propulsion materials and/or liquid combustibles. In addition, the invention is directed to new procedures for the simple, economical and environment protecting preparation of the triglycerides of modified structure and/or the mixtures comprising them, and at the same time the glycerol produced in the known procedures in large amounts can be utilized.

21 Claims, 2 Drawing Sheets

USE OF FUELS OR FUEL ADDITIVES BASED ON TRIGLYCERIDES OF MODIFIED STRUCTURE AND PROCESS FOR THEIR PREPARATION

This Application is the National Phase Under 35 U.S.C. §371 of PCT International Application No. PCT/HU2008/000013 which has an International filing date of Feb. 5, 2008, which claims priority to Hungary Application No. P0700128 filed on Feb. 6, 2007, Hungary Application No. P0700187 filed on Mar. 1, 2007; and to Hungary Application No. P0700281 filed on Apr. 16, 2007. The entire contents of all applications listed above are hereby incorporated by reference.

TECHNICAL FIELD

The invention is directed to the use of triglycerides of modified structure, mostly known per se, as fuels, combustibles, or fuel and/or combustible additives, and to the fuels comprising them. In the description and in the claims the expression "fuel" means liquid motor propulsion materials and/or liquid combustibles. In addition, the invention is directed to new procedures for the simple, economical and environment protecting preparation of the triglycerides of modified structure and/or the mixtures comprising them, and at the same time the glycerol produced in the known procedures in large amounts can be utilized.

It was found, that the triglycerides of modified structure, in themselves, or mixed with the usual liquid fuels (i.e. diesel oil, biodiesel, combustible oil, etc.) can be used for the propulsion of diesel engines and/or for burning in oil-operated boilers. Since according to this invention the most important field of application of the triglycerides of modified structure is their use as engine propulsion material, hereinafter the invention will be described in relation to this field of application.

BACKGROUND ART

The lipids of animal and vegetable origin (oils and fats, that is, triglycerides) are the sources of the so-called biodiesel (BD) fuel, which, as a result of its energy content approaching the combustion heat of hydrocarbons, is becoming a more and more important factor in traffic, as an acknowledged and supported alternative combustible. This way for example, according to the EU directives, by 2010 it must be a 5.75% component of the fuel of diesel-operated vehicles.

The triglycerides are the triesters of glycerol, a trivalent alcohol, formed with different fatty acids. Most of the fatty acids are $C_{16}$-$C_{22}$ acids, but in some triglycerides shorter ($C_4$-$C_{15}$) and/or longer ($C_{23}$-$C_{28}$) fatty acid chains may also occur. The fatty acids esterifying the glycerol are mostly saturated in the fats (i.e. stearic acid, palmitic acid), in the oils the different acids may contain 1-3 unsaturations (oleic acid, linolenic acid), and this is the cause of the lower melting point of the latter lipids. (According to convention, triglycerides still liquid at 25° C. are called oils). As a result of their energy content animal fats and vegetable oils would be applicable for the propulsion of diesel-operated engines without any chemical transformation. But their molecular masses and viscosities are too high (850-1000; >30 cSt at 40° C.), this way they cannot be fed or atomised directly into the modern engines in the proper amount and form. That is why their molecular masses must be reduced to the atomisation limit value: the substances with lower molecular masses are thinner, their pour point is lower, this way they can be used as fuel too. This effort led to the "biodiesel" (BD, mixture of fatty acid methyl esters): the 3 equivalent fatty-acid methyl esters and the 1 equivalent glycerol are produced by the "fragmentation" (methanolic transesterification, or more correctly: alcoholysis) of the triglycerides (their molecular masses being 290-310, their viscosities 4-5 cSt):

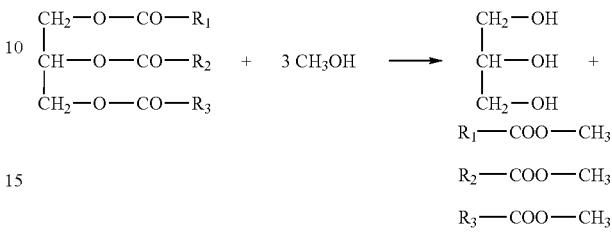

The glycerol obtained in 10-12% in itself is unsuitable for fuel purposes; its combustion heat is low, and its viscosity is orders of magnitude higher than that of the original triglyceride. Its appearance as an industrial by-product (and in a heavily contaminated form) had serious consequences: glycerol lakes and sewage waters contaminating the environment. Their elimination is a serious environmental burden all over the world. By recognizing this, in order to replace the current manufacturing of biodiesel, research was conducted by us for a new technology and a new type of fuel, the starting materials of which are also natural triglycerides.

Alcoholysis of the triglycerides can be executed by acid- or base-catalysis. Because of the higher rate of reaction the latter one is more widespread. The operation is relatively quick (1-3 hours, 30-70° C.), it can be a continuous or batch procedure. Because of the equilibrium reaction, methanol is used at least in twofold molar excess, at the end of the reaction the excess is evaporated and recirculated. Following separation of the lower glycerol phase and washing with water, the ester mixture is vacuum distilled, and the biodiesel is obtained with 98-99% yield, and this is mixed with hydrocarbon based diesel oil (for example JP 7197047, DE 3515403). There are procedures with high energy demand, using extreme reaction conditions (260° C., 10 MPa) (FR 2,752,242).

Alcoholysis is carried out with refined (purified, freed from organic polymer and wax) lipids. But at the same time the free fatty acid content of the triglycerides occurs as a problem, which in case of animal fats and/or used household oils can be very high (15-20%). In this case the fatty acids are generally esterified with acid catalysis in the first step (because the free fatty acids generate soaps with base catalysts, which results is emulsions, and these are difficult to process), the acidic catalyst is washed out, and alcoholysis of the triglyceride is carried out in basic conditions (WO0112581) [Excellent review of the current status of the biodiesel technique can be found in the literature: E. Lotero et al., Catalysis, 19, 41-83 (2006); which can be read on the Internet too].

In recent years many patents have claimed the different embodiments of this "classic" biodiesel manufacturing. For example in U.S. Pat. No. 5,730,029 the mixture of the fatty acid-methyl esters are prepared from the natural triglyceride starting material of indicated origin and composition, according to the reaction of column 6. In Patent No. EP 626,442 also the biodiesel is prepared by methanolic transesterification, according to the "traditional" reaction scheme found on page 5. In Application No. WO 2005/028597 the fatty acid methyl esters are prepared also from triglycerides, as starting material, i.e. according to the "glycerol" route. In US Application No. 060199970 there is a proposal for the utilization of the glycerol side product prepared by the conventional route, according to which it is added to the mixture of the methyl esters prepared as above, in the form of glycerol-acetals. In US Application No. 040108219 mixture of low viscosity unsaturated fatty acid methyl esters and glycerol are produced from triglycerides with high degree of unsaturation by methanolic transesterification. Hungarian patent no. HU 207117 also prepares "fatty acid ester mixtures applicable as fuel" according to the classic "glycerol" technology. A great disadvantage of all the patents mentioned above is the generation of the highly contaminated glycerol side product and the high amounts of washing waste water.

Although glycerol is a valuable starting material for the chemical industry and it can be used in itself in many application fields, but as a result of the running up of biodiesel production in the past years, huge amounts of unmarketable stocks accumulated from this material, and that is why the "glycerol chemistry"—i.e. investigation of new application fields—is in the centre of interest. The situation is complicated by the fact that in the different technologies crude glycerol is produced, characterized by high water content (8-15%), methanol content (1-10%), the presence of mono- and diglycerides, etc. Dehydration of glycerol is an energy consuming process in itself, which, combined with the purification steps relating to the other contaminants, makes this potential "starting material" extremely expensive.

The most plausible utilization of the glycerol prepared this way—just because of the generation of the huge amounts—would be its "feedback" as fuel or fuel additive, after the transformation to suitable derivatives. And indeed, numerous patent applications published lately offer solution to this. For example according to U.S. Pat. No. 6,890,364 acetals, ketals, etc. are prepared from the suitably prepared (purified, dehydrated) glycerol, and their physicochemical properties allow the application of a small portion of the glycerol as fuel, or as additive of biodiesels. According to FR patent No. 2,866,653 ether derivatives are prepared from the glycerol of biodiesel production with olefins, which are added to the fuel, improving with this the emission values. But the biodiesels may not be diluted too much with these derivatives, because of their low combustion heat. And since the biodiesels themselves are—within a foreseeable period of time—only additives (in 5-20%) of the petrodiesel, it is obvious that the utilization of the waste glycerol in this form can only be limited.

On the basis of what was said above it is obvious that the costs of the current biodiesel production cannot be reduced significantly, that is, the competitiveness of the fatty acid-methyl esters cannot be increased, even with the distinctive tax policy. Manufacturing is already optimized and automated, the price of vegetable oils will not decrease because of the growing demand, and the possible price reduction of methanol, because of its small consumption norms, cannot significantly influence biodiesel prices. The glycerol side product is rather a burden than a cost reduction factor for biodiesel factories. The consequence of this is that the direct utilization of triglycerides as fuel is of continuing interest (see for example Hungarian Patent No. 208 994).

In connection with this two publications may be mentioned: On the basis of their systematic studies R. O. Dunn and M. O. Bagby, two well known experts of the field propose many different solutions for viscosity reduction, allowing the direct application of vegetable oils (addition of co-solvents and solubilisation to inhibit later phase-separations, and at the same time for the permanent decrease of pour point), for example by the formation of soybean oil, 2-octanol and ethanol three phase systems [R. O. Dunn and M. O. Bagby: Journal of the American Oil Chemists' Society, 77(No. 12), 1315-1323 (December, 2000)]. In the July issue of the same journal R. O. Dunn proposes the introduction of a new multicomponent system [Journal of the American Oil Chemists' Society, 79(No. 7), 709-715 (July, 2002)].

DISCLOSURE OF THE INVENTION

Figure 1:
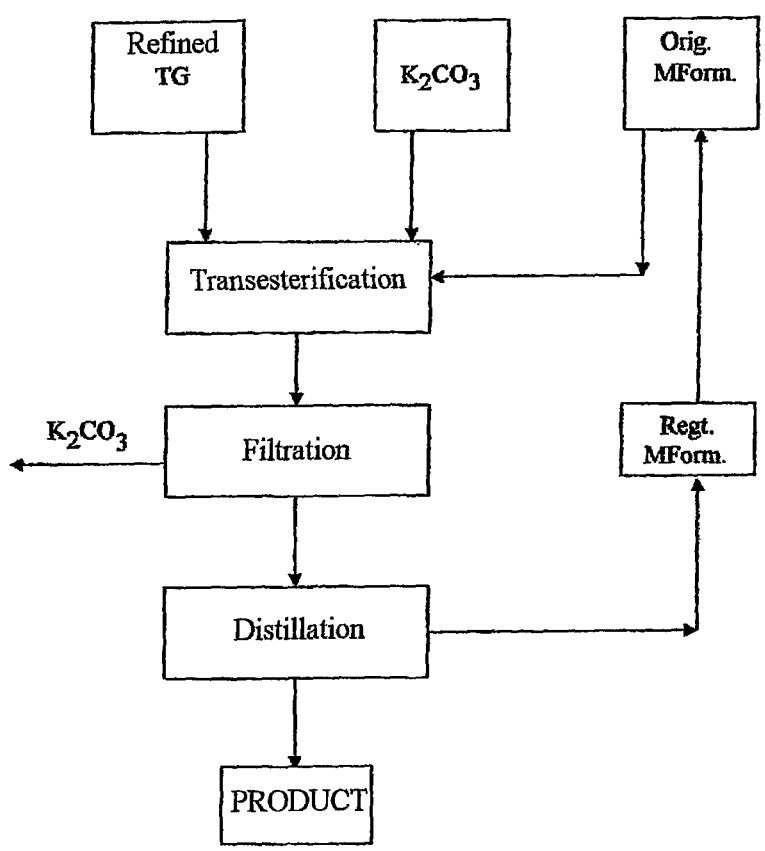
FIG. 1 provides a flow diagram of an embodiment of the reaction according to the invention.

In our work a new method was elaborated for the reduction of viscosity and molecular mass of triglycerides, respectively. The glycerol-triester is reacted with another ester (and not with an alcohol), namely with the methyl/ethyl esters of short chain ($C_1$-$C_6$) carboxylic acids, in such a way that the acid functions (=acyl groups) exchange only partially. This way triglycerides of modified structure are obtained, in which part of the fatty acid groups (the long ones) were present in the original (natural, otherwise known as biological) triglycerides too, but at the same time another part of them (the short chain ones) were formed in a chemical reaction, and were introduced with an ester. This way it can be attained that the molecular mass (and at the same time the viscosity and the pour point) of the original triglyceride decreases, without the production of glycerol. This solution, and its result, as a new type of fuel or fuel components is not known in the technical literature. This is independent from the fact that the transformation of triglycerides to short chain triglycerides—with other methods and for other applications—is known from the technical literature.

Of course, in the chemical reaction the long chain fatty acids "displaced" from the original triglyceride remain in the new substance, they become its ingredient, since in our procedure their methyl/ethyl, etc. esters (that is, the current "biodiesel") are automatically produced, in parallel with the triglyceride of modified structure. This component makes only a minor part of the new fuel, but it is automatically present in addition to the modified triglyceride. Its significance is that this way the triglycerides are totally utilized as fuel, with a wasteless technology

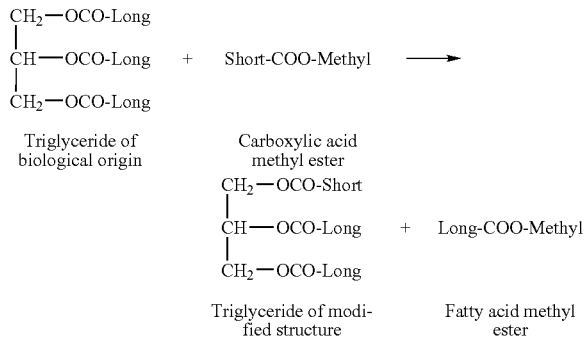

Many different procedures can be used for the preparation of the triglycerides of modified structure, for example partial acidolysis of triglycerides of biomass origin with short chain carboxylic acids, but in this case the displaced long chain fatty acids must be separated from the newly prepared triglycerides to be used as fuel (for example with alkaline washing), because these acids cannot be directly used as fuel components, because of their corrosivity. In this case the energy content of the liberated fatty acids is lost from the fuel.

In our work it was recognized that triglycerides of modified structure, with the general formula (I) can excellently be used as fuels or fuel-additives.

The invention is directed to the use of the triglycerides of modified structure, with the general formula (I) as fuels, combustibles or fuel additives and/or combustible additives,

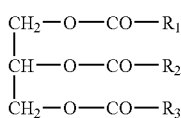

(I)

wherein in general formula (I) $R_1$, $R_2$ and $R_3$ independently represent hydrogen or $C_1$-$C_{28}$ alkyl group, optionally incorporating at least one carbon-carbon double bond, with the following limitation:
(a) at least 3%, but at most 97% of the $R_1$, $R_2$ and $R_3$ groups present represent an alkyl group occurring in the triglycerides of biological origin, optionally incorporating at least one carbon-carbon double bond
(b) the remaining $R_1$, $R_2$ and $R_3$ groups present represent hydrogen and/or a $C_1$-$C_5$ alkyl group, optionally incorporating at least one carbon-carbon double bond,
wherein the % values specified relate to the number of the $R_1$, $R_2$ and $R_3$ groups.

The invention further provides a process for the preparation of triglycerides of modified structure of formula (I) and optionally for the preparation of the mixture of the fatty acid-alkyl esters of the general formula R"—COO-Alk (II), wherein
(a) R" represents an alkyl group, optionally incorporating at least one carbon-carbon double bond, occurring in the triglycerides of biological origin, and optionally in the mono- and diglycerides and free fatty acids accompanying them, and this way covers those $R_1$, $R_2$, $R_3$ groups of general formula (I) which originate from the triglycerides of biological origin,
(b) Alk represents a $C_1$-$C_5$ alkyl group, optionally incorporating at least one carbon-carbon double bond.

Another aspect of the invention is the application of the mixture of compounds of general formula (I) and (II), prepared according to the procedure described above, as fuels, combustibles or fuel-additives and/or combustible-additives.

A further aspect of the invention provides the mixture of the compounds of general formula (I) and (II), which is qualified as new material.

Another aspect of the invention provides a process for the preparation of the triglycerides of modified structure with general formula (I), wherein a triglyceride of biological origin, or the mixture of such triglycerides, which mixture optionally may comprise mono- and diglycerides and free fatty acid of biological origin, is reacted with suitable amount of glycerol—optionally comprising alcohol and/or water—or with suitable amount of triacetylated glycerol prepared in advance from such glycerol, wherein the $R_1$, $R_2$ and $R_3$ portion of the acyl groups is according to general formula (I)—in the presence of acidic or basic. In this case the main point of the invention is that the free hydroxy groups formed following the glycerolysis/transesterification are acylated with a carboxylic acid ester of general formula R'—COO-Alk— wherein R' represents hydrogen or a $C_1$-$C_5$ alkyl group, optionally incorporating at least one carbon-carbon double bond, and Alk is as defined above—and optionally the alcohols of general formula Alk-OH and the fatty acids of general formula R'—COOH are removed with washing.

In one of the procedures of the invention a triglyceride of biological origin, or the mixture of such triglycerides, which optionally may comprise free fatty acid of general formula R"—COOH and mono- and diglycerides of biological origin, is reacted with one or more carboxylic acid ester of general formula R'—COO-Alk—wherein R' represent hydrogen and/or a $C_1$-$C_5$ alkyl group, optionally incorporating at least one carbon-carbon double bond—and wherein the amount of the carboxylic acid esters of the general formula R'—COO-Alk is adjusted to 3-97% of the stoichiometric amount necessary for the complete transesterification of the triglycerides of biological origin, and to the stoichiometric amount needed for the esterification of the mono- and diglycerides and the free fatty acids of the general formula R"—COON optionally present; optionally the reaction is terminated, and the fatty acids of the general formula R'—COOH and the alcohols of the general formula of Alk-OH optionally generated as side products are re-moved by washing, and the prepared fatty acid alkyl esters of the general formula R"—COO-Alk are separated if necessary.

Termination of the reaction may be necessary if the intended use of the mixture or the compound of general formula (I) is as fuel-additive. In this case the viscosity of the product is practically between 4 and 6 cSt. Accordingly it is reasonable to measure the viscosity of the reaction mixture, and when the suitable viscosity is reached, then to terminate the reaction. In other cases, for example if it is used as combustible, fuel additive or combustible additive, this is not necessary.

For the persons skilled in the art it is obvious from the above definition of general formula (I) that the % values indicated there mean statistical values.

It is also known for the person skilled in the art that the alkyl groups, optionally incorporating at least one carbon-carbon double bond in positions $R_1$, $R_2$ and/or $R_3$, and occurring in the triglycerides of biological origin, may be either different or the same. Similarly, the modifying groups in positions $R_1$, $R_2$ and/or $R_3$ (hydrogen, $C_1$-$C_5$ alkyl groups, optionally incorporating at least one carbon-carbon double bond) can also be different or the same.

Those compounds of general formula (I) are particularly advantageous, wherein at least one of $R_1$, $R_2$ and $R_3$ represents hydrogen and/or $C_1$-$C_5$ alkyl group, optionally incorporating at least one carbon-carbon double bond, while at least one of the other groups is an alkyl group, optionally incorporating at least one carbon-carbon double bond, occurring in the triglycerides of biological origin.

The $C_1$-$C_5$ alkyl group, optionally incorporating at least one carbon-carbon double bond in positions $R_1$, $R_2$, and/or $R_3$ is preferably methyl, ethyl, propyl, acryl or methacryl group particularly preferably methyl group.

The invention further provides a fuel comprising one or more triglycerides of general formula (I) according to the definition above, and at least one usual fuel component.

As it has already been mentioned the compounds of general formula (I) can by themselves be used as fuels. As a consequence of this the lower limit of the usual fuel component in the mixtures mentioned above is not critical, and it can be very small value (for example it can be some % by volume). The upper limit of the usual fuel component is determined fundamentally by economical considerations. This upper limit may be for example 90% by volume, preferably 60-80% by volume.

The usual fuel components comprise the well known hydrocarbon based fuels (i.e. diesel oil, combustible oil), but the fuels named biodiesels according to the current definition (fatty acid methyl esters) can also be included here.

Most of the triglycerides of modified structure of general formula (I) are known compounds. The compounds called in the technical literature "synthetic" or "structured triglyceride" are used for cosmetic purposes, as pharmaceutical additives, diet-supplements, parenterally absorbing nutrients, consistency improving agents (see U.S. Pat. Nos. 3,000,748, 3,936,312, 4,137,334, 4,832,975), but possibility of their use as fuel is not even mentioned in the technical literature. In the technical literature exclusively the mixing of those synthetic triglycerides into fuels is described, in which all the three fatty acid groups of the starting triglycerides of biological origin are replaced by short chain fatty acid groups. This is for example the triacetin (that is glycerol-triacetate), mentioned in the EP Patent No. 1,331,260 and in Biotechnology Letters 25(No. 15), 1239-1241), which can be used for improving the consistency or for the improvement of the pour point and viscosity of the fatty acid methyl esters prepared by alcoholysis from rapeseed oil. But these totally transesterified triglycerides are out of the scope of the compounds of general formula (I), because the compounds of general formula (I) are qualified as partially transesterified triglycerides in each case.

Many procedures are described in the publications referred to above for the preparation of the compounds of general formula (I), which can also be used for the preparation of the compounds of general formula (I) not yet described.

Such Known Methods are the Following:

The triglyceride of biological origin is transesterified with glycerol (glycerolysis), the mixture of the obtained mono- and diglycerides is acylated with acetic acid anhydride, this way mono- and diacetylated triglycerides are obtained. The mixture of the same substance is obtained if the triglyceride of biological origin is transesterified with triacetin (triacetylglycerol). If the goal is the insertion of a longer fatty acid function, for example oleil function, then following glycerolysis the free hydroxy groups of the mono- and diglycerides are acylated with oleic acid chloride, in the presence of acid scavenger (see patents U.S. Pat. Nos. 3,766,227, 4,263,216, 5,419,925, 5,434,278, 6,159,933).

All these known methods can be used for the preparation of triglycerides of modified structure utilisable as fuel or fuel-additives according to the invention. But these known procedures are multistep procedures, are relatively complicated and expensive.

In our work a new procedure was also elaborated for the preparation the compounds of general formula (I), which is excellently applicable in cases if the starting triglycerides of biological origin are available in a form contaminated with free fatty acids (and as a consequence with mono- and diglycerides). These are for example the used household oils, which could have been introduced into the traditional biodiesel preparation process in which the triglycerides are submitted to alcoholysis, only after preliminary refinement, that is, after the removal of the free fatty acid and mono- and diglycerides.

This new procedure provides the compounds of general formula (I) together with the fatty acid alkyl esters of general formula (II), which are generally used as biodiesels:

$$R''\text{—COO-Alk} \qquad (II)$$

wherein (a) R" represents an alkyl group, optionally incorporating at least one carbon-carbon double bond, occurring in the triglycerides of biological origin, and optionally in the mono- and diglycerides and free fatty acids accompanying them, and this way covers the $R_1$, $R_2$, $R_3$ groups of general formula (I) originating from the triglycerides of biological origin, (b) Alk represents a $C_1$-$C_5$ alkyl group, optionally incorporating at least one carbon-carbon double bond, and the mixture of substances can be directly used as fuel or fuel-component. This mixture of substances is a new type of fuel and combustible, and as such it is covered by the invention. The mixture of the compounds of general formula (I) and (II) are new. It is preferable, if in the compounds of general formula (II) Alk represents methyl group, while it is particularly preferred, if the value of Alk is 2-5.

Another aspect of the invention provides a process for the preparation of the mixture of triglycerides of modified structure with general formula (I) and fatty acid alkyl esters of general formula (II) by the partial transesterification of the triglycerides of biological origin with fatty acid alkyl esters of general formula R'—COO-Alk, and optionally with concomitant esterification of the accompanying mono- and diglycerides and free fatty acids, wherein R' represents hydrogen or a $C_1$-$C_5$ alkyl group, optionally incorporating at least one carbon-carbon double bond, and this way covers those $R_1$, $R_2$ and/or $R_3$ groups of general formula (I), which don't originate from triglycerides of biological origin.

According to the invention a triglyceride of biological origin, or the mixture of such triglycerides, which optionally may comprise free fatty acids of the general formula R"—COOH, and mono- and diglycerides of biological origin, is reacted with one or more carboxylic acid esters of the general formula R'—COO-Alk, wherein R' represents hydrogen or a $C_1$-$C_5$ alkyl group, optionally incorporating at least one carbon-carbon double bond, and the amount of carboxylic acid esters of the general formula R'—COO-Alk is adjusted to 3-97% of the stoichiometric amount necessary for the complete transesterification of the triglycerides of biological origin, and to the stoichiometric amount needed for the esterification of the mono- and diglycerides and the free fatty acids of the general formula R"—COOH optionally present; optionally the reaction is terminated, and the fatty acids of the general formula R'—COOH and the alcohols of the general formula of Alk-OH optionally generated as side products are removed by washing, and the obtained fatty acid alkyl esters of the general formula R"—COO-Alk are separated if necessary.

The procedure of the invention comprises the following processes:

The fatty acid portion of the carboxylic acid ester of the general formula R'—COO-Alk displaces at least one esterifying fatty acid portion of the starting triglyceride of biological origin, and this way a triglyceride is obtained which is esterified at least on one hydroxy group with a shorter chain fatty acid, while the alcoholic part of the reagent forms a $C_1$-$C_5$ alkyl ester of the displaced fatty acid. If the starting mixture contains even free fatty acid, then it is also esterified to a $C_1$-$C_5$ alkyl ester, while the reagent is transformed to a $C_1$-$C_5$ fatty acid side product, which at the end of the reaction is removed by alkaline washing of the mixture. The mono- and diglycerides accompanying the triglycerides are also acylated in the process, and they themselves become modified triglycerides, and the alcohol liberating from the reagent can be removed in the washing step.

Both the partially transesterified triglycerides of biological origin (with reduced molecular masses), and the $C_1$-$C_5$ alkyl esters of the obtained fatty acids (because of their advantageous viscosity and pour point) are particularly useful as fuels.

DETAILED DESCRIPTION OF THE INVENTION a/. Catalysis, Reaction Conditions

The transesterification reaction can be acid- or base catalyzed. In our procedure the characteristics of the starting natural triglyceride defines the catalyst to be chosen. If only a minimal amount (<0.5%) free fatty acid is present (for example in refined vegetable oils), because of the higher reaction rate, alkaline catalysts are to be used, in such a ratio, that the amount of the catalyst molarly exceeds that of the free fatty acids, because the latter bind part of the alkaline catalyst in the form of carboxylic acid salts. Such a catalysis theoretically can be homogeneous or heterogeneous, in the embodiment of the invention it is heterogeneous, since the reactants (carboxylic acid monoesters and triglycerides) and the products (modified triglycerides and fatty acid esters) hardly dissolve, or don't dissolve at all the possible different catalysts (alkalinealcoholates/hydroxides/carbonates/hydrocarbonates/(oxids). Addition of an inert solvent (for example cyclohexane) can result in dissolving the alkaline-alcoholate catalysts, but in case of the use of a solvent the process economy (utilization of the reactor volume, energy demand of the solvent evaporation and regeneration, the losses related to it, etc.) would decrease. This is why the use of (anhydrous) $K_2CO_3$ is preferred, which forms potassium soap with the accompanying fatty acids, while it transforms to $KHCO_3$ (inhibiting the generation of water in the neutralization reaction), but which also catalyzes the transesterification reaction. With intensive stirring of the reaction mixture transesterification takes place within 2 hours at 50° C. (see Example 1). At the end of the reaction the catalyst is filtered off, and by the evaporation of the excess carboxylic acid ester from the reaction mixture the new engine fuel is obtained. A preferred embodiment of the reaction is demonstrated on flow chart 1 in FIG. 1.

Figure 2:
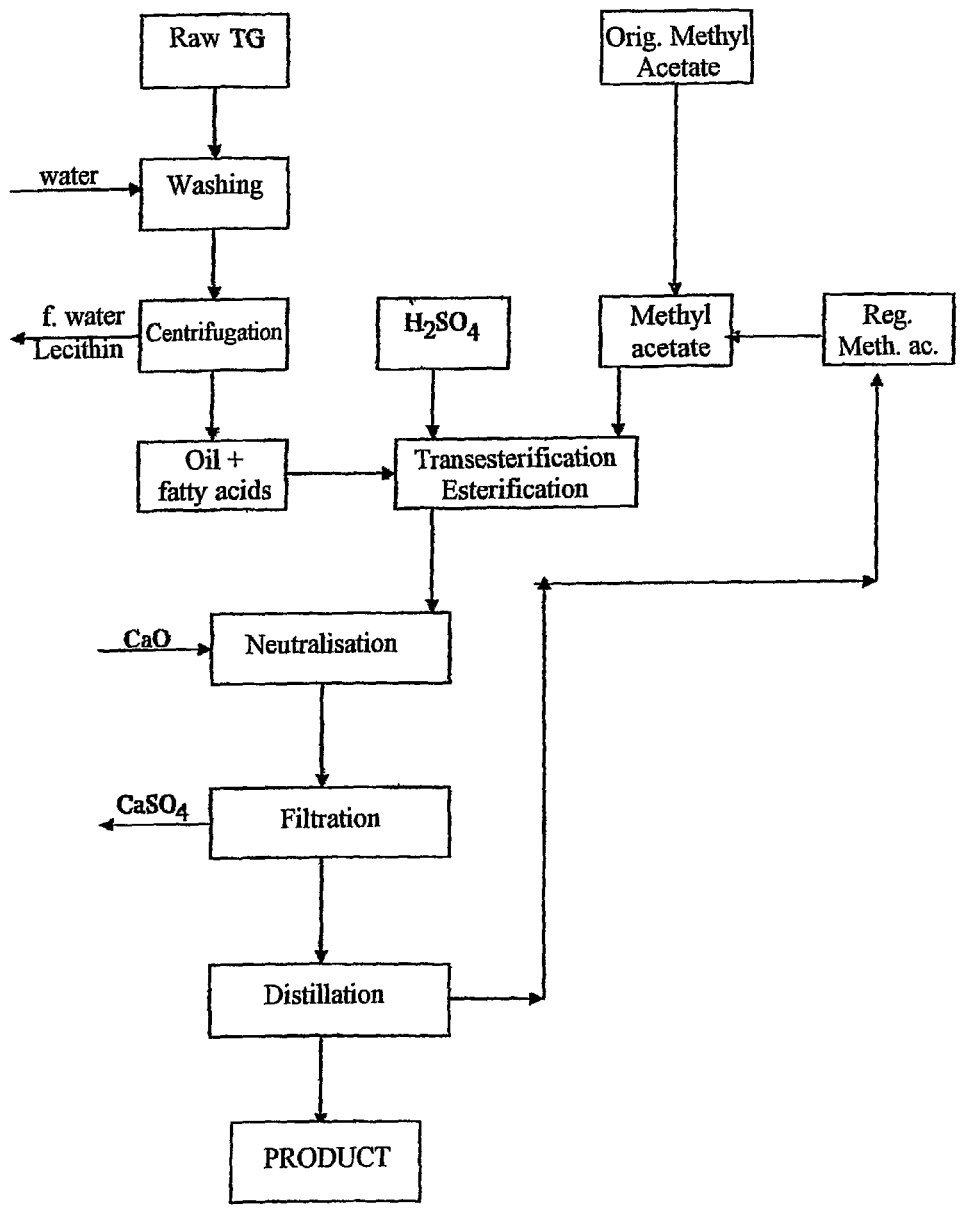
FIG. 2 provides a flow diagram of an embodiment of the reaction according to the invention.

Starting from raw vegetable oils, used restaurant frying oils, or fats of animal origin, transesterification is carried out by acidic catalysis, because of their high free fatty acid content, and at the same time esterification of these free fatty acids is also carried out. Preferably p-toluenesulphonic acid is used, and the reaction mixture is agitated at reflux temperature for 5 hours. In this case much more transesterification component is used, which provides the methyl ester of the free fatty acid in an equilibrium reaction (i.e. if methyl acetate is used), meanwhile significant amount of acetic acid is produced. After cooling the catalyst is neutralized by calcium oxide, the excess amount of the transesterification (and in this case esterifying) component is evaporated, and by filtering out the calcium salts from the reaction mixture the new type of biofuel is obtained. A preferred embodiment of the reaction is demonstrated on flow chart 2 in FIG. 2.

b/. Molar Rates

Selection of the suitable molar ratios is not critical. But practically the trans-esterification (and esterification) reaction is an equilibrium reaction, the equilibrium constant is always different in the changing structure/composition system of the triglycerides of different origin (i.e. the different fatty acids bound in them), and optionally the free fatty acids and the transesterification component (methyl/ethyl/propylformate/acetate/propionate). Because of the same reason the physicochemical characteristics (pour point, viscosity) of the products obtained (or their mixture) will also be different, but the latter ones can be modified in the desired direction by changing the rate of transesterification (i.e. number and type of the shorter chain acyl groups introduced into the new triglycerides). This is why it is reasonable to determine the transesterification rate considered to be optimal by carrying out pilot experiments in each system, but which will be the same in case of identical starting materials (i.e. in the system of sunflower oil comprising X % free fatty acid as triglyceride, and methyl acetate as transesterification component), and with a fixed physicochemical characteristic (for example −5° C. turbidity point). Since the number of sources available for the production of alternative fuels is not too high (rapeseed oil, sunflower oil, slaughter house waste, used restaurant baking oils), measurement of the parameters relating to the individual cases can easily by executed.

The amount to be used of the transesterification component is affected by one more factor: namely the water content of the starting triglyceride. If it exceeds 0.1%, then the water should be removed preferably by azeotropically evaporating a portion of the methyl acetate before the addition of the catalyst, this way ensuring the suitable conditions for the reaction sensitive to the water content.

Advantages of the procedure of the invention:
at least 10% more biofuel is obtained from a unit amount of biomass,
glycerol is not obtained as side product, that is the total energy content of the lipids is converted to engine fuel
in biodiesel factories already in operation, manufacturing of these type of fuels can be continued without reconstruction
because of the smaller number of operation steps the energy requirement and working hour demand of the preparation decreases
there is no need for the application of special additives for the improvement of the physicochemical properties (turbidity point/pour point/viscosity)
in case of triglycerides with high free fatty acid content (unrefined) as starting materials, the difficult two-step method (acid-catalyzed preesterification of the fatty acids, and base-catalyzed alcoholysis) ("integrated biodiesel synthesis") can be omitted
as a consequence of what was mentioned above, the expensive triglyceride refining can be omitted, this way engine fuel can be prepared directly even from the much cheaper crude oils/fats (price of the refined soybean oil is about twice as high as that of the crude!)
dewaxing of the crude vegetable oils can also be omitted at the preparation for fuel manufacturing, since in the transesterification reaction the waxes (=amorphous esters of fatty acids formed with fatty alcohols) produce fatty acid methyl ester with methyl acetate (=current biodiesel) and fatty alcohol acetates, which are high energy content compounds by themselves, and as such, become components of the new fuel mixture
by the effect of the transesterification component the free hydroxy groups of the mono- and diglycerides inherently present in the triglycerides of biological origin are also acylated, this way these components are also transformed to (new) triglycerides, that is become components of the fuel of new type
In each case a lower iodine number product is obtained from the same starting material than with the conventional biodiesel manufacturing.

Furthermore the invention provides a procedure for the preparation of the modified triglycerides with the above general formula (I), which has a very advantageous aspect, that is it uses the glycerol obtained in large amounts as side product in the course of the traditional biodiesel manufacturing.

Following the examination of the technical literature we came to the conclusion that the use of waste glycerol of biodiesel manufacturing is possible only if the combustion heat of the glycerol derivatives to be prepared reaches the 35000 kJ/kg value, expected as a minimum from the diesel fuels. This is possible only through attaching to the —OH groups suitably high energy containing substitutes, that is if at least partly suitably long carbon chains are connected to the hydroxy groups of the glycerol, that is alkylation or acylation is carried out with compounds comprising such functions.

The combustion heat value of the natural triglycerides is around 39500 kJ/kg, that is, these substances could be suitable fuels for diesel engines, because of their energy content, but because of their high viscosity (35-50 cSt at 40° C.) they are unsuitable for the purpose, since in the current motor constructions they burn imperfectly as a consequence of their weak atomisation characteristics, their enthalpy is not used in sufficient degree, causing even damage of the engine with this.

If the substances of general formula (I) or their mixtures formed with the substances of general formula (II) are intended to be used as fuels of diesel engines in themselves ("neat"), or as additives of the traditional fuels, then in the course of their preparation the long chain acyl groups of the natural triglycerides are suitably replaced by short chain groups to such extent that the kinematic viscosity of the obtained modified triglycerides of general formula (I), or their mixture formed with the fatty acid alkyl esters of general formula (II) decreases to 5-6 cSt at 38° C. This value is in harmony with the current EU and US standards. According to our experiences this requirement is fulfilled—depending on the structure of the transesterification carboxylic acid ester of formula R'—COO-Alk—preferably at 30-50% transesterification rate. This involves that the 35-50 cSt viscosity of the starting triglyceride of natural origin (as dependent on the type of the "parent-oil") can be modified in a wide range (decreased) according to the demand and need. Of course, this viscosity can similarly be generated by mixing the compounds of the general formula (I) and (II).

But in our research conducted for the utilization of the glycerol waste of biodiesel manufacturing, determination of the physicochemical characteristics, primarily the viscosity of the triglycerides modified in less than 10% and more than 90% ratio was studied for practical reasons. It was studied how these materials prepared from glycerol meet the criteria of using them as engine fuels. It was found, that if the majority of the hydroxy groups of the glycerol, i.e. more than 90% of them are esterified with long chain acyl groups, while the remaining hydroxy groups are acylated with short chain carboxylic acid derivatives, then the substances obtained this way have suitably low viscosity in addition to their high energy content to use them as fuel of diesel engines, or as additives of fuels. And similarly, although the energy content of the glycerol triesters containing more than 90% short carbon chain is rather low (around 20,000 kJ/kg), their preferred viscosity values allow them to be used as propulsion materials, by improving the consistency of the viscous fuels as their components/additives.

For the elaboration of a further procedure the effect exerted to viscosity was also studied. We wanted to use glycerol for the preparation of a fuel in such a way that natural triglycerides (optionally containing mono- and diglycerides and free fatty acids) were submitted to glycerolysis, that is they were transesterified with glycerol, a trihydric alcohol, and as a result a mixture of mono- and diglycerides was obtained, for example as it is illustrated below:

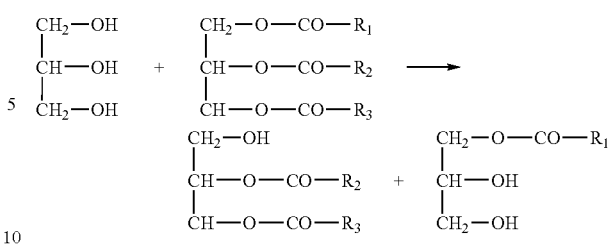

It is conceivable that by changing the molar ratio of the reagents the ratios of the obtained mono- and diglycerides compared to each other will be modified, i.e. by increasing the molar ratio of glycerol the number of free hydroxy groups increases in the product, while in an opposite case their relative number decreases. Following this, if the obtained hydroxy groups are acylated (esterified) with a short chain carboxylic acid derivative, triglycerides are obtained, in which a predetermined portion of the acyl groups originates from the triglyceride of biological origin (long chain, for example $C_{16}$-$C_{22}$ fatty acid functions), while the other portion will be the short chain acyl group used in esterification:

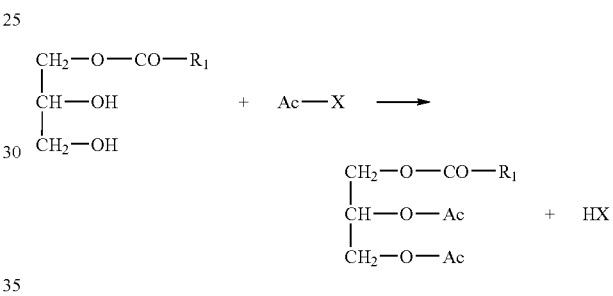

For the production of new/modified (tri)glycerides glycerolysis in itself is a well known and used procedure. For example in U.S. Pat. No. 4,263,216 triglycerides comprising saturated fatty acid acyl functions are reacted with glycerol and different diglycerides are prepared this way. In U.S. Pat. No. 6,159,993 the monoglycerides obtained from vegetable oils with glycerolysis are acylated with acetic acid anhydride, and this way diacetylated monoglycerides are obtained (that is, these themselves are triglycerides, known in the literature as "aceto-fats" or "aceto-glycerides") with favourably changed physicochemical properties.

In our new procedure, in order to get the required properties (molecular mass reduction resulting in decreased viscosity) the newly obtained hydroxy groups are suitably reacted with alkyl- or alkenyl esters of short chain carboxylic acids (for example methyl acetate), and in addition to the product alcohol bound in the transesterification carboxylic acid ester is obtained, which—just for shifting the equilibrium reaction to the direction of the product—is evaporated from the reaction mixture (boiling point of the methanol-methyl acetate azeotropic mixture is 54° C. that of the methyl acetate is 57° C. and that of the methanol is 65° C., i.e. the equilibrium can be pushed into the direction of the product by using methyl acetate in excess):

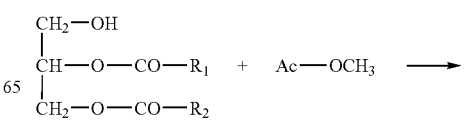

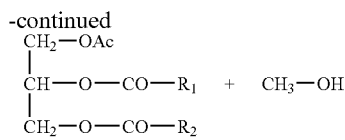

The glycerolysis itself—just like all (trans)esterification reactions—can be base- or acid catalyzed. The esterification executed with basic catalysts (alkalialcoholates, metal sodium, metalhydrides) are very quick, they take place within a few hours, but the procedure is very sensitive to the traces of water, which inactivate very quickly such catalysts. That is, in our case, when we want to (trans)esterify the waste glycerol of high water content of the biodiesel preparation, suitably acid catalysis is used (sulphuric acid, organic sulphonic acids), but in this case much longer reaction time is necessary. Generally glycerolysis is carried out at 100-120° C., in our case the reaction is conducted at 90-95° C., because of the high water content.

Esterification following the glycerolysis can also be acid- or base-catalyzed, depending on the quality of the acylating agent (acid anhydrides, acid chlorides, in our case carboxylic acid esters). It follows from what is said above, that in our invention suitably acid catalysis is used, and this way the mono- and diglycerides esterified with the short chain acyl group (i.e. the modified triglycerides) are obtained in the reaction following the glycerolysis. The temperature of this ("second") reaction is limited by the boiling point of the acylating agent used, which in case of acetic acid anhydride can be over 100° C., in our case 40-60° C., depending on the boiling point of the used small molecule carboxylic acid ester. As a consequence of this, the second acylating reaction is rather slow at atmospheric pressure.

Although reaction kinetic studies were not conducted by us, the possibility of an alternative reaction—at least partially—is obvious for us from the technical literature. Namely, if acylation of the free hydroxyl groups is carried out under pressure, the used low boiling point carboxylic acid ester can also be added at the beginning of the glycerolysis, in order to acylate the newly obtained hydroxyl groups in situ. But in this case the glycerol-carboxylic acid ester transesterification reaction also occurs concurrently:

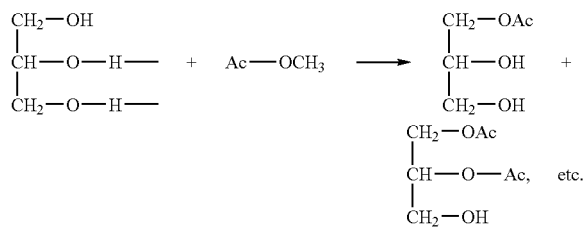

But the existence of this route is absolutely indifferent from the point of view of the final product, because the acylated glycerol (this is also a triglyceride!), as transesterification reagent will react with the triglyceride of biological origin introduced, resulting in a final product, which also comprises the short chain acyl groups (that is, the modified triglyceride):

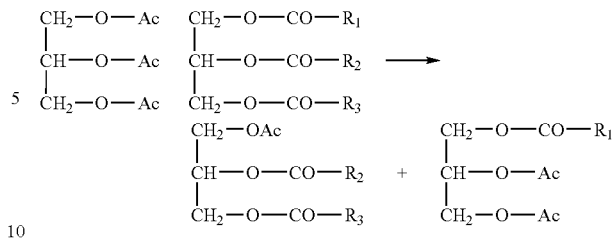

In the English language technical literature such a mutual transesterification of two triglycerides is called "interesterification" or "randomization", since the position of the individual acyl groups on the glycerol frame is random (for example U.S. Pat. No. 5,434,278).

But this reaction route can be executed at atmospheric pressure too: excess methyl acetate is added to the water containing glycerol, part of which will be azeotropically evaporated with water. Following this the catalyst is added to the reaction mixture (in this case even alkali alcoholates, because our system was dehydrated), and the triacetate of glycerol, the triacetin is prepared. The amount of the natural triglyceride is chosen (that is the triacetin:glycerol molar rate is adjusted) depending on the final product to be prepared. Since the molecular mass of triacetin is 218, that of rapeseed oil (average molecular mass) is 878, in reacting molar amounts the triacetin:triglyceride mass ratio is almost exactly 1:4. For the quick processing of the glycerol accumulated in the past years, if our materials are for example reacted with 9:1 triacetin-triglyceride molar rate (=2, 2:1 mass rate), then the following mixture is obtained after transesterification, with the following average composition:

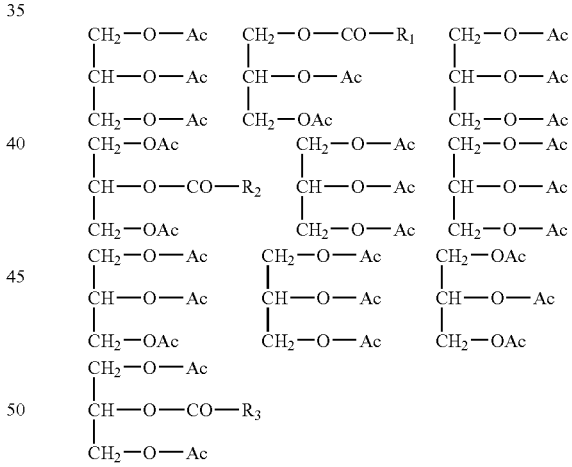

that is our mixture comprises acyl groups of biomass origin only in 3/30=10%. The energy content of such a mixture is the weighted average of the enthalpy of the components (concerning the molecular portions this is equal to the mixture of 90% triacetin—its combustion heat is 19860 kJ/kg, and 10% natural triglyceride—its combustion heat is 39500 kJ/kg)

$$0.9 \times 19860 + 0.1 \times 39500 = 21824 \text{ kJ/kg}$$

that is, because of its low combustion heat it is not suitable for engine fuel in itself. In order to get mixtures suitable for this purpose, the amount of triacetin (or triacetin "equivalent", TA that is the presence of three acetoxy groups) is obtained by the following equation:

$$TA \times 19860 + (1-TA) \times 39500 = 35000$$

From this TA=0.23. Therefore in order to get the desired combustion heat the triacetin content (that is the ratio of the short acyl groups) must be below 23% in the triglyceride mixture obtained, which is equal to the following: the mass ratio of the starting glycerol:triglyceride of biomass origin (in case of dehydration) must be 1:8 or below (that is in 1000 kg starting mixture the amount of glycerol can be max. 110 kg, that is in this case the molar ratio is 1, 2:1).

Therefore according to what was mentioned above, if we work in anhydrous conditions, if 10-11 weight % glycerol is added, directly usable engine fuel is obtained with still suitable energy content. If higher amount of glycerol excess is added, owing to the lower energy content of the mixture prepared, it can only be used as combustible and/or biodiesel additive.

For example, if the mixture discussed above (with 21824 kJ/kg energy content) is mixed with biodiesel in 20% ratio, then a mixture with 0.2×21824+0.8×40000=36365 kJ/kg energy content is received, which is a suitable fuel for diesel engines.

In our work the role of the water content of the glycerol was also investigated during glycerol elimination, and the following relations were found:

In the conditions of the reaction the water content of the contaminated glycerol hydrolyzes the added triglyceride ester function:

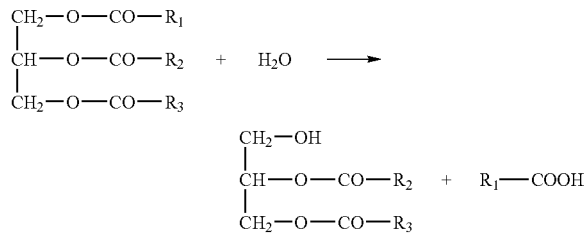

In the consecutive acylation reaction the alkanecarboxylic acid ester (i.e. methyl acetate) forms ester bonds with the hydroxy groups, and transforms the fatty acids released at hydrolysis to their methyl ester (=biodiesel). In the process methanol and acetic acid are obtained:

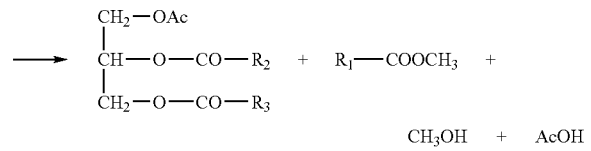

By evaporating the methanol and the excess ethyl acetate, and by removing the acetic acid by alkaline washing, the mixture of the triglyceride of modified structure and biodiesel is obtained.

For example in case of 1000 g of 90%, water containing glycerol waste+2000 g rapeseed oil (about 4, 3:1 molar rate) the following is happening:

→ 900 g (9.78 mol) glycerol + 100 g (5.56 mol) water + 2000 g (2.28 mol) rapeseed oil ->

| | OH groups | OCOR groups | free fatty acid |
|---|---|---|---|
| before hydrolysis: | 9.78 × 3 = 29.34 | 2.28 × 3 = 6.84 | |
| after hydrolysis: | 29.34 + 5.56 = 34.9 | 6.84−5.56 = 1.28 | 5.56 |
| by the addition of methyl acetate: | OAc groups 3.49 | OCOR groups 1.28 | fatty acid methyl ester 5.56 |
| energy content: | | | |
| triacetin equivalent | 34.9/3 = 11.63 mol = 2.535 kg × 19860 kJ = 50352 kJ | | |
| triglyceride equivalent | 1.28/3 = 0.43 mol = 0.375 kg × 39500 kJ = 14797 kJ | | |
| biodiesel | 5.56 mol = $\dfrac{1.634 \text{ kg}}{4.544 \text{ kg}} \times 40000$ kJ = $\dfrac{65386 \text{ kJ}}{130535 \text{ kJ}}$ | | | i.e.: 28726 kJ/kg, unsuitable for direct application as fuel, it can only be used as additive.

But by doubling the amount of the rapeseed oil, 31975 kJ/kg combustion value is already obtained, and by reducing the amount of the water containing glycerol to 10% 36062 kJ/kg value is obtained, that is the waste glycerol can also be added to the triglyceride of biomass origin (this way the molar ratio of the glycerol:oil is about 1:1) if the water is not removed in advance. It follows from this fact that surprisingly the water containing glycerol can be used the same way as the dehydrated one.

On the basis of the above calculation it can be acknowledged that by increasing the water content, increasing amount of the natural triglyceride hydrolyzes, the number of the obtained hydroxy groups, and this way the amount of low energy content components, comprising short acyl groups will increase in the product mixture, decreasing its combustion value. Nevertheless the mixture with lower combustion value is excellently utilizable for other fuel engineering purposes, for example for burning in oil boilers. This way the full range utilization of the glycerol waste is possible.

If we want to use the accumulated and regularly generated waste glycerol for the production of directly utilizable fuel, it should be used in less than 10% ratio as additive in the process or the preparation of the triglycerides of modified structure, as new types of fuels. If we want to eliminate the waste more quickly, then the ratio of this component can be raised even over 50%. But in this case the product obtained can only be used as fuel additive of combustible.

Important characteristic of the triglyceride mixtures prepared with our method is the significant decrease of the viscosities, thanks to the appearance of the short chain acyl groups in the modified triglycerides (molecular mass reduction). That is why by adding such additives the atomisation properties of the used fuels change advantageously.

Finally the effect of other contaminants of the glycerol waste was studied in the course of application. The methanol remaining from the alcoholysis step of the biodiesel production (1-10%), as it was mentioned, can be removed by the evaporation of a portion of the methyl acetate added in the form of an azeotropic mixture, but just like the water, it can be reacted with the natural triglyceride ester function, while fatty acid methyl esters (biodiesel) and free hydroxy groups form (methanolysis), the latter ones are also acylated by the methyl acetate, as it has already been described, and this way increasing the number of the low energy content acetoxy groups. As a consequence, if the goal is the production of a product of fuel quality, the methanol is suitably distilled in advance.

The mono- and diglycerides themselves occurring in minimal amounts in the glycerol waste are transformed to useful triglycerides.

Our theoretical considerations and working hypothesis were experimentally proven. The new fuels and combustibles, and the procedures for preparing them are described in the following, non-limiting examples.

BEST MODE OF CARRYING OUT THE INVENTION

EXAMPLE 1

To the mixture of 885 g (about 1 mol) refined, anhydrous sunflower oil (free fatty acid content<0.5%) and 148 g (2 mol) methyl acetate 20 g anhydrous (powdered) $K_2CO_3$ is added, and the mixture is agitated for 2 hours at 50-55° C. After cooling the $K_2CO_3$ is filtered off, and following the addition of 10 g acetic acid the unreacted methyl acetate is evaporated. The residue is washed with 2×100 ml $NaHCO_3$ solution, dried with $Na_2SO_4$ and vacuum-distilled (5 Hgmm). 945 g product (that is the mixture of diacetylated triglycerides and fatty acid methyl esters) is obtained, its kinematic viscosity is 6.5 cSt at 40° C. (that of the refined sunflower oil is 37.1 cSt at 38° C., that of the mixture of methyl esters prepared from it is 4.2 cSt at 40° C.), its turbidity point is −6° C. (that of the sunflower oil is: +7.2° C., that of the methyl esters is: 0° C.). Distillation residue: 29 g.

EXAMPLE 2

The mixture of 970 g (about 1 mol) refined and anhydrous rapeseed oil (free fatty acid content<0.5%), 120 g (2 mol) methyl formate and 10 g p-toluenesulphonic acid is agitated for 5 hours meanwhile the methyl formate is refluxed (32° C.). After cooling the catalyst is neutralized with 5 g CaO, the reaction mixture is filtered, and the unreacted portion of the methyl formate is evaporated. The residue is washed with 2×100 ml $NaHCO_3$ solution, dried with $Na_2SO_4$ and vacuum-distilled (5 Hgmm). 1015 g product is obtained (distillation residue: 33 g), its kinematic viscosity is 7.2 cSt at 40° C., its turbidity point is −4° C. (the respective values of the rapeseed oil and the fatty acid methyl ester mixture prepared from it: 37 cSt [38° C.] and −3.9° C., or 6.7 cSt [40° C.] and −2° C.).

EXAMPLE 3

To the mixture of 970 g (about 1 mol) refined rapeseed oil and 140 g (0.5 mol) oleic acid (anhydrous) 210 g (3.5 mol) methyl formate and 10 g p-toluenesulphonic acid are added. The reaction is agitated for 5 hours with reflux, than it is neutralized with 15 g CaO and filtered. The unreacted methyl formate is evaporated, the residue is washed with 2×100 ml 2% $NaHCO_3$ solution, dried on $Na_2SO_4$, and vacuum distilled at 5 Hgmm. 1185 g product is obtained (distillation residue 41 g), the kinematic viscosity of which is 6.5 cSt at 40° C., turbidity point −7° C.).

EXAMPLE 4

To the mixture of 1600 ml (1450 g) dehydrated and deacidified rapeseed oil (free fatty acid content<0.2%) and 2000 ml (1860 g) ethyl acetate 32 g sodium-methylate is added with intensive agitation. It is agitated for 1 hour at room temperature, and the reaction mixture is neutralized with 18 ml (33 g) 96% sulphuric acid. The precipitated sodium-sulphate is filtered off with a G4 filter, and the crystals are washed with a small amount of ethyl acetate. Ammonia gas is bubbled through the filtrate for 1 minute while agitated. The precipitated ammonium-sulphate is filtered off with a G5 filter, and the excess ethyl acetate is evaporated from the filtrate on a rotary distiller. The concentrate is filtered through a G5 filter. 1810 ml (1640 g) fuel is obtained (13.1% weight increase), its viscosity is 5.3 cSt at 40° C. The fuel can be directly used for propulsion of diesel engines.

EXAMPLE 5

From the mixture of 10.2 g, 90% water containing glycerol (0.1 mol glycerol, 0.057 mol water) and 25 g methyl acetate the water-methyl acetate azeotropic mixture (54-55° C.), and the excess methyl acetate are evaporated. 87.8 g (0.1 mol) refined rapeseed oil and 1 g p-toluenesulphonic acid are added to the residue, and the mixture is agitated for 12 hours at 95° C. Following this 44.4 g (0.6 mol) methyl acetate is added to the browned reaction mixture, and the mixture of mono- and diglycerides is acylated for 8 hours at reflux temperature (60-65° C.). Following this the catalyst is neutralized with 0.5 g CaO, and the Ca salts are filtered off, and the obtained methanol and the excess methyl acetate are evaporated. 105 g (96%) triglyceride mixture of modified structure is obtained, its combustion value is 35580 kJ, its viscosity is 8 cSt at 40° C.

EXAMPLE 6

Dehydration according to Example 1 is carried out with double amount of methyl acetate, after the evaporation of the azeotropic mixture (30 g) 0.5 g Na-methylate is added, and refluxed for 6 hours, the catalyst is neutralized with 2 ml acetic acid, and the excess methyl acetate is evaporated. Following this 87.8 (0.1 mol) refined rapeseed oil and 1.5 g p-toluenesulphonic acid are added to the obtained triacetin, and transesterification is carried out within 36 hours at 90° C. Following this the catalyst and the acetic acid traces are neutralized with 1 g CaO, and the Ca salts are filtered off. 103 g (94%) triglyceride mixture of modified structure is obtained, with the characteristics listed in Example 1.

EXAMPLE 7

10.2 g, 90%, water containing glycerol (0.1 mol glycerol, 0.057 mol water) is reacted for 12 hours at 90-95° C. with 87.8 g (0.1 mol) rapeseed oil and 1.5 g p-toluenesulphonic acid. Following this 50 g (0.68 mol) methyl acetate is added, and refluxed for 8 hours. After cooling the catalyst and the acetic acid obtained are neutralized with 1 g CaO, and after filtration the excess methyl acetate and the obtained methanol are evaporated. 109 g (95%) fuel is obtained, its combustion value is 35144 kJ/kg, its viscosity is 7 cSt at 40° C.

EXAMPLE 8

To 100 g of the glycerol phase of biodiesel manufacturing 3 ml 50% sulphuric acid is added, and the accompanying fatty acids are released from their potassium salt ("soap") with agitation. Following the addition of 878 g rapeseed oil and 15 g p-toluenesulphonic acid the temperature is gradually increased to 90° C., while the contaminated methanol evaporates (4 g). After 12 hours the reaction mixture is cooled, 500 g methyl acetate is added, and the mixture is refluxed for 10 hours. After cooling the catalyst and the sulphuric acid and the acetic acid obtained are neutralized with 12 g CaO, and after filtering off the salts the excess methyl acetate and the obtained methanol are evaporated. 1055 g (92%) fuel/combustible is obtained, its combustion value is 34920 kJ/kg, and its viscosity is 6.5 cSt at 40° C.

The invention claimed is:

1. A mixture of modified structure triglycerides of general formula (I)

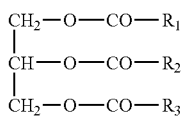
(I)

and the fatty acid-alkyl esters of general formula R"—OO-Alk (II)
  wherein in general formula (I) $R_1$, $R_2$ and $R_3$ independently represent hydrogen or $C_1$-$C_{28}$ alkyl group, optionally incorporating at least one carbon-carbon double bond, with the following limitation:
    (a) at least 3%, but at most 97% of the $R_1$, $R_2$ and $R_3$ groups present represent an alkyl group occurring in the triglycerides of biological origin, optionally incorporating at least one carbon-carbon double bond
    (b) the remaining $R_1$, $R_2$ and $R_3$ groups present represent hydrogen and/or a $C_1$-$C_5$ alkyl group, optionally incorporating at least one carbon-carbon double bond,
  and the % values specified relate to the number of the $R_1$, $R_2$ and $R_3$ groups, and in general formula (II)
    (a) R" represents an alkyl group, optionally incorporating at least one carbon-carbon double bond, occurring in the triglycerides of biological origin, and optionally in the mono- and diglycerides and free fatty acids accompanying them, and this way covers the $R_1$, $R_2$ $R_3$ groups of general formula (I) originating from the triglycerides of biological origin,
    (b) Alk represents a $C_1$-$C_5$ alkyl group, optionally incorporating at least one carbon-carbon. double bond.

2. A fuel, fuel additive, combustible or combustible additive which comprises a mixture of (a) a modified triglyceride of formula (I)

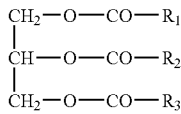
(I)

and (b) a fatty acid-alkyl ester of the formula R"—COO-Alk (II)
  wherein $R_1$, $R_2$ $R_3$ independently represent hydrogen or a $C_1C_{28}$ alkyl group, optionally incorporating at least one carbon-carbon double bond, wherein
    (i) at least 3% but at most 97% of the $R_1$, $R_2$ and $R_3$ groups present represent an alkyl group occurring in the triglycerides of biological origin, optionally incorporating at least one carbon-carbon double bond, and
    (ii) the remaining $R_1$, $R_2$ and $R_3$ groups present independently represent hydrogen or a $C_1$-$C_5$ alkyl group, optionally incorporating at least one carbon-carbon double bond,
  and the % values specified relate to the number of the $R_1$, $R_2$ and $R_3$ groups, and in general formula (II):and wherein
    (i) R" represents an alkyl group, optionally incorporating at least one carbon-carbon double bond, occurring in the triglycerides of biological origin, and optionally in the mono- and diglycerides and free fatty aids accompanying them, and this way covers the $R_1$, $R_2$ $R_3$ groups of general formula (1) originating from the tryglycerides of biological orgin, and
    (ii) Alk represents a $C_1$-$C_5$ alkyl group, optionally incorporating at least one carbon-carbon double bond.

3. The fuel and fuel additive, combustible or combustible additive of claim 2, wherein in formula (II) Alk represents a $C_2$-$C_5$ alkyl group, optionally incorporating at least one carbon-carbon double bond.

4. A fuel comprising the mixture of claim 1 or 2, and optionally at least with one usual fuel component.

5. A fuel, fuel additive, combustible or combustible additive comprising a modified triglyceride of formula (I):

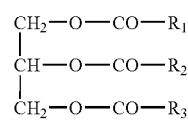
(I)

wherein
in $R_1$, $R_2$ and $R_3$ independently represent hydrogen or $C_1$-$C_{28}$ alkyl group, optionally incorporating at least one carbon-carbon double bond, with the following limitation:
    (a) at least 3%, but at most 97% of the $R_1$, $R_2$ and $R_3$ groups present represent an alkyl group occurring in the triglycerides of biological origin, optionally incorporating at least one carbon-carbon double bond, and
    (b) the remaining $R_1$, $R_2$ and $R_3$ groups present independetnly epresent hydrogen or a $C_1$-$C_5$ alkyl group, optionally incorporating at least one carbon-carbon double bond,
    and the % values specified relate to the number of the $R_1$, $R_2$ and $R_3$ groups.

6. A fuel, fuel additive, combustible or combustible additive according to claim 5, wherein
    (a) at least 10%, but at most 90% of the $R_1$, $R_2$ and $R_3$ groups present represent an alkyl group occurring in the triglycerides of biological origin, optionally incorporating at least one carbon-carbon double bond,
    (b) at least 10%, but at most 90% of the remaining $R_1$, $R_2$ and $R_3$ groups present represent hydrogen and/or a $C_1$-$C_5$ alkyl group, optionally incorporating at least one carbon-carbon double bond, and the % values specified relate to the number of the $R_1$, $R_2$ and $R_3$ groups.

7. The fuel, fuel additive combustible or combustible additive according to claim 6, wherein at least one of $R_1$, $R_2$ and $R_3$ represents hydrogen and/or $C_1$-$C_5$ alkyl group, optionally incorporating at least one carbon-carbon double bond, while at least one another represents an alkyl group occurring in the triglycerides of biological origin, optionally incorporating at least one carbon-carbon double bond.

8. The fuel, fuel additive, combustible or combustible additive according to claim 7, wherein said $C_1$-$C_5$ alkyl group, is a methyl, ethyl, propyl, acryl or methacryl group.

9. The fuel, fuel additive, combustible or combustible additive according to claim 8, wherein said $C_1$-$C_5$ alkyl group is a methyl group.

10. A fuel comprising one or more modified triglycerides of general formula (I) of claim 5, and at least one usual fuel component.

11. The fuel according to claim 10, characterized that it contains diesel oil, combustion oil and/or known biodiesel as usual fuel component.

12. The fuel according to claim 10 or 11, comprising 0.75 to 85 volume % modified triglycerides of general formula (I).

13. A method for preparing the modified triglycerides of general formula (I), and optionally the fatty acid-alkyl esters of general formula R"—COO-Alk (II), wherein $R_1$, $R_2$, $R_3$, R" and Alk are as defined in claim 1, comprising reacting a triglyceride of biological origin, or the mixture of such triglycerides, in the presence of an alkaline or acidic catalyst, which optionally comprise free fatty acids of general formula R"'—COOH and mono- and diglycerides of biological origin with one or more carboxylic acid ester of general formula R'—COO-Alk—wherein R' represent hydrogen and/or a $C_1$-$C_5$ alkyl group, optionally incorporating at least one carbon-carbon double bond—and wherein the amount of the carboxylic acid esters of the general formula R'—COO-Alk is adjusted to 3-97% of the stoichiometric amount necessary for the complete transesterification of the triglycerides of biological, origin, and to the stoichiometric amount needed for the esterification of the mono- and diglycerides and the free fatty acids of the general formula R"'—COOH optionally present; optionally the reaction is terminated, and the fatty acids of the general formula R'—COOH and the alcohols of the general formula of Alk-OH optionally generated as side product are removed by washing, and the prepared fatty acid alkyl esters of the general formula R"—COO-Alk are separated if necessary.

14. The method according to claim 13, wherein a mixture of the compounds of general formulas (I) and (II) is prepared.

15. The method according to claim 13 or 14, wherein the reaction is performed in the presence of an alkaline catalyst selected from the group consisting of alcoholates of earth metals, alcoholates of alkaline earth metals, hydroxides of earth metals, hydroxides of alkaline earth metals, oxides of earth metals, oxides of alkaline earth metals, carbonates of earth metals, carbonates of alkaline earth metals, hydrocarbonates of earth metals, hydrocarbonates of alkaline earth metals and ion exchange resins of hydroxides ion cycle.

16. The method according to claim 13 or 14, wherein the reaction is performed in the presence of an acidic catalyst selected from the group consisting of mineral acids, Lewis acids, organic sulphonic acids, and ion exchange resins of hydrogen ion cycle.

17. The method according to claim 13 or 14, characterized that lower temperature limit of the transesterification is 20° C., the upper temperature limit is the boiling point of the carboxylic acid ester of general formula R'—COO-Alk used.

18. A method for the preparation of the modified structure triglycerides of general formula (I) defined in claim 1, comprising reacting of a triglyceride of biological origin, or a mixture of such triglycerides, in the presence of an alkaline or acidic catalyst, which optionally comprises mono- and diglycerides and free fatty acids of biological origin, with a suitable amount of glycerol—optionally comprising alcohol and/or water—or with a suitable amount of triacetylated glycerol prepared in advance from said glycerol wherein the free hydroxy groups formed following the glycerolysis/interestification are acylated with a carboxylic acid ester of general formula R'—COO-Alk- wherein R' represents hydrogen or a $C_1$-$C_5$ alkyl group, optionally incorporating at least one carbon-carbon double bond, and Alk is as defined in claim 1—and optionally the alcohols of general formula Alk-OH and the fatty acids of general formula R'—COOH obtained as side products are removed with washing.

19. The method according to claim 18, wherein the reaction is performed in the presence of an acidic catalyst selected from the group consisting of mineral acids, Lewis acids, organic sulphonic acids, and ion exchange resins of hydrogen ion cycle.

20. The method according to claim 19, wherein the reaction is performed in the presence of an alkaline catalyst selected from the group consisting of alcoholates of earth metals, alcoholates of alkaline earth metals, hydroxides of earth metals, hydroxides of alkaline earth metals, oxides of earth metals, oxides of alkaline earth metals, carbonates of earth metals, carbonates of alkaline earth metals, hydrocarbonates of earth metals, hydrocarbonates of alkaline earth metals and ion exchange resins of hydroxides ion cycle.

21. The method according to any one of claims 18-20, wherein the acylation reaction is carried out between 20° and the boiling point of the carboxylic acid ester of general formula R'—COO-Alk used.

* * * * *